United States Patent
Brandau et al.

(10) Patent No.: US 9,593,193 B2
(45) Date of Patent: Mar. 14, 2017

(54) NITRILE RUBBERS HAVING LOW EMISSION VALUES

(71) Applicant: ARLANXEO DEUTSCHLAND GMBH, Dormagen (DE)

(72) Inventors: Sven Brandau, Strasbourg (FR); Andreas Kaiser, Strasbourg (FR); Hans Magg, Kuerten (DE); Uwe Westeppe, La Wantzenau (FR)

(73) Assignee: ARLANXEO Deutschland GmbH, Dormagen, DE (US)

( * ) Notice: Subject to any disclaimer, the term of this patent is extended or adjusted under 35 U.S.C. 154(b) by 0 days.

(21) Appl. No.: 14/976,255

(22) Filed: Dec. 21, 2015

(65) Prior Publication Data

US 2016/0108162 A1 Apr. 21, 2016

Related U.S. Application Data

(62) Division of application No. 14/513,522, filed on Oct. 14, 2014, now Pat. No. 9,279,028.

(30) Foreign Application Priority Data

Oct. 14, 2013 (EP) .................... 13290246

(51) Int. Cl.
| | | |
|---|---|---|
| *C07F 7/18* | (2006.01) | |
| *C08F 2/00* | (2006.01) | |
| *C08F 210/00* | (2006.01) | |
| *C08F 236/12* | (2006.01) | |
| *C08F 36/06* | (2006.01) | |
| *C08C 1/14* | (2006.01) | |
| *C08K 5/37* | (2006.01) | |
| *C08F 220/44* | (2006.01) | |
| *C08L 9/02* | (2006.01) | |
| *C08J 3/24* | (2006.01) | |
| *C08K 3/04* | (2006.01) | |

(52) U.S. Cl.
CPC ............. *C08F 236/12* (2013.01); *C08C 1/14* (2013.01); *C08F 36/06* (2013.01); *C08F 220/44* (2013.01); *C08J 3/247* (2013.01); *C08K 3/04* (2013.01); *C08K 5/37* (2013.01); *C08L 9/02* (2013.01); *C08J 2309/02* (2013.01)

(58) Field of Classification Search
CPC ...... C08F 236/12; C08F 220/44; C08F 36/06; C08F 2/24; C08L 9/02; C08L 9/04; C08C 1/14; C08K 5/37
USPC ................. 524/565; 526/224, 348
See application file for complete search history.

(56) References Cited

U.S. PATENT DOCUMENTS 5,627,250 A * 5/1997 Tsuji .................... C08F 236/12
264/328.2

FOREIGN PATENT DOCUMENTS

JP 48055283 8/1973

* cited by examiner

*Primary Examiner* — William Cheung

(57) ABSTRACT

An improved polymerization process using a specific molecular weight regulator makes it possible to produce new nitrile rubbers featuring particularly low emission values and giving vulcanizates which have an advantageous profile of properties and which are of outstanding quality, in particular in odor-sensitive applications.

14 Claims, No Drawings

NITRILE RUBBERS HAVING LOW EMISSION VALUES

This application is a divisional of pending U.S. patent application Ser. No. 14/513,522 filed Oct. 14, 2014, entitled "Nitrile Rubbers Having Low Emission Values," now issued as U.S. Pat. No. 9,279,028, which is entitled to the right of priority of European Patent Application 13290246.1, filed Oct. 14, 2013, the contents of which are hereby incorporated by reference in their entirety.

FIELD OF THE INVENTION

The invention relates to a nitrile rubber having low emission values, to a process for the production thereof, to vulcanizable mixtures comprising this nitrile rubber and, furthermore, to a process for producing vulcanizates from these mixtures and to the resultant vulcanizates.

BACKGROUND OF THE INVENTION

Nitrile rubbers, also abbreviated to "NBR", are rubbers which are co- or terpolymers of at least one $\alpha,\beta$-unsaturated nitrile monomer, at least one conjugated diene and optionally one or more additional copolymerizable monomers. Nitrile rubbers of this type and processes for producing such nitrile rubbers are known, see, for example, Ullmann's Encyclopedia of Industrial Chemistry, VCH Verlagsgesellschaft, Weinheim, 1993, p. 255-261.

NBR is typically produced by emulsion polymerization to initially obtain an NBR latex. The NBR solid is isolated from this latex by coagulation, usually using salts or acids. The emulsion polymerization is typically carried out using molecular weight regulators. Commonly used molecular weight regulators are based on mercaptans. The use of dodecyl mercaptans is of particular importance for molecular weight regulation of emulsion rubbers based on monomers such as styrene, butadiene, acrylonitrile, (meth)acrylic acid, fumaric acid, ethyl acrylate, butyl acrylate, 2-ethylhexyl acrylate, chloroprene and others.

U.S. Pat. No. 2,434,536 describes that synthetic rubbers based on diolefins, for example butadiene and optionally additional copolymerizable monomers, for example styrene, α-methylstyrene, vinylnaphthalene, acrylonitrile, methacrylonitrile, methyl methacrylate, ethyl fumarate or methyl vinyl ketone, are produced by emulsion polymerization in the presence of aliphatic mercaptans as molecular weight regulators. It is disclosed that these mercaptans comprise at least 7 and preferably 10 or more carbon atoms. It is preferable to use aliphatic mercaptans having a mean molecular weight of from 188 to 230 which comprise at least 50% dodecyl mercaptan and which comprise the balance to 100% in the form of mercaptans having 10 to 16 carbon atoms.

Ullmanns Enzyklopädie der technischen Chemie [Ullmann's encyclopedia of industrial chemistry] 4th edition, volume 13, page 611-612 describes in general terms that the molecular weight of nitrile-butadiene rubbers can be controlled by using alkyl mercaptans, di- and polysulfides or xanthogen disulfides. tert-dodecyl mercaptan and diisopropylxanthogen disulfide are named as the regulators mainly used.

Tertiary dodecyl mercaptans (also abbreviated to "TDM" or "TDDM") are also often used in industrial practice. The TDM commercially available from Chevron Phillips is known, for example, and generally consists of a large mixture of a very wide range of isomers.

Whether, or to what extent, volatile substances outgas from vulcanizates produced on the basis of nitrile rubber is relevant for a very wide range of applications, for example floor coverings of nitrile rubber. Applicant studies showed that nitrile rubbers produced using TDM comprise a high proportion of sulphur compounds and, furthermore, non-sulphur-containing impurities in the TDM in VOC tests (carried out by means of TDS GC-MS analyses according to VDA recommendation 278 September 2002). Depending on the mode and purpose of the application these can outgas in practical use and can lead to noticeable, unpleasant odour nuisances that may become unacceptable.

While there is extensive literature in existence about the influence of the salts that can be used for latex coagulation on the properties of the NBR obtained, there are no indications or studies concerning the influence of the molecular weight regulators on the volatile constituents contents in nitrile rubbers.

DD 154 702 discloses a process for free-radical copolymerization of butadiene and acrylonitrile in emulsion, which is controlled via a specific, advantageously computer-aided metered addition programme for the monomers and the molecular weight regulator, for example tert-dodecyl mercaptan, and in which the latices obtained are worked up by coagulation in an acidic medium to give the solid rubber. A significant advantage of the process is stated to be that, due to the use of acids in the coagulation, the resin soaps and/or fatty acid soaps used as emulsifiers remain in the rubber, i.e., are not washed out as in other processes. This is claimed not just to have the advantage of good properties of the NBR but particularly also to improve the economics of the process and to avoid wastewater pollution by washed-out emulsifier. It is stated that the butadiene-acrylonitrile copolymers comprising 10-30% by weight of acrylonitrile feature good elasticity properties and low-temperature properties combined with elevated swell resistance and advantageous processability. Measures making it possible to influence the VOC values of the nitrile rubber or the profile of properties of the vulcanized NBR cannot be inferred from the teaching of this patent.

EP-A-0 692 496, EP-A-0 779 301 and EP-A-0 779 300 each describe nitrile rubbers based on an unsaturated nitrile and a conjugated diene and said nitrile rubbers each comprise 10-60% by weight of unsaturated nitrile, have a Mooney viscosity in the range of 15-150 or, according to EP-A-0 692 496, of 15-65 and comprise at least 0.03 mol of a $C_{12}$-$C_{16}$-alkylthio group per 100 mol of monomer units, this alkylthio group comprising at least three tertiary carbon atoms and a sulphur atom bonded directly to at least one of the tertiary carbon atoms. Each of the nitrile rubbers is produced in the presence of a $C_{12}$-$C_{16}$-alkyl thiol of appropriate structure as molecular weight regulator which functions as a "chain transfer agent" and is thus incorporated into the polymer chains as an end group.

It is stated that the nitrile rubbers according to EP-A-0 779 300 have an unsaturated nitrile composition distribution breadth "ΔAN" (AN stands for acrylonitrile) in the copolymer in the range of from 3 to 20. The process for their production differs from that of EP-A-0692496 in that only 30-80% by weight of the total monomer amount is employed on commencement of the polymerization and the remaining monomer amount is only metered in at a conversion of the polymerization of 20-70% by weight.

It is stated that the nitrile rubbers according to EP-A-0 779 301 comprise 3-20% by weight of a fraction having a low molecular weight having a number-average molecular weight Mn of less than 35 000. The process for the production of said rubbers differs from that of EP-A-0 692 496 in that only 10-95% by weight of the alkythiol are mixed into the monomer mixture prior to the polymerization and the remaining amount of the alkylthiol is metered in only once a polymerization conversion of 20-70% by weight has been attained.

According to EP-A-0 692 496, EP-A-0 779 300 and EP-A-0 779 301, it is in each case essential for the production of the nitrile rubbers to use alkylthiols in the form of the compounds 2,2,4,6,6-pentamethylheptane-4-thiol and 2,2,4, 6,6,8,8-heptamethylnonane-4-thiol as molecular weight regulator. In this connection it is pointed out that nitrile rubbers having poorer properties are obtained when the conventional, known tert-dodecyl mercaptan is used as regulator.

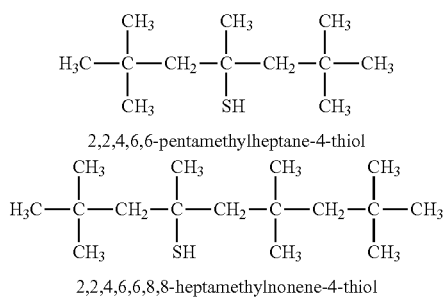

2,2,4,6,6-pentamethylheptane-4-thiol 2,2,4,6,6,8,8-heptamethylnonene-4-thiol

It is asserted that the nitrile rubbers produced in EP-A-0 692 496, EP-A-0 779 300 and EP-A-0 779 301 have an advantageous profile of properties and that they facilitate good processability of the rubber mixtures and low mould soiling on processing. The vulcanizates obtained are said to have a good combination of low-temperature stability and oil resistance and good mechanical properties. Emphasis is furthermore placed on the high productivity of the production process due to high polymerization conversions of more than 75%, preferably more than 80%, the high vulcanization rate in the vulcanization with sulphur or peroxides, in particular for NBR-types for injection moulding, a short scorch time of the nitrile rubbers and a high crosslinking density. Neither EP-A-0 692 496 nor EP-A-0779 300 nor EP-A-0779 301 give indications as to the influence, if any, of the molecular weight regulators used on the properties of the NBR and the emission characteristics thereof.

WO-A-2001/094432 discloses specific branched nitrile rubbers which, at a content of bound unsaturated nitrile of from 15% to 50% by weight and a Mooney viscosity (ML 1+4 at 100° C.) in the range of from 15 to 150 Mooney units, exhibit chain branching in the range of from 0° to 20° (determined by what is known as the $\Delta\delta_B$ value) and a solubility measured in methyl ethyl ketone at 20° C. of ≥85% by weight. These nitrile rubbers are provided by effecting the polymerization using a molecular weight regulator, wherein the regulator is not added to the polymerization mixture in one charge, i.e., at once, but rather in at least two stages, preferably three or more stages, though continuous addition over the entire polymerization time is also possible. According to WO-A-2001/094432, various chain regulators can be used and these are mentioned in EP 0 799 300 BI on page 3, lines 51-58 and page 4, paragraph 3. Preference is given to alkyl thiols, such as 2,4,4-trimethyl- pentane-2-thiol, 2,2',4,6,6'-pentamethylheptane-4-thiol, 2,2', 4,6,6',8,8'-heptamethyl-nonane-4-thiol and mixtures thereof.

WO-A-2008/142042, WO-A-2008/142035 and WO-A-2008/142039 each disclose processes used to produce specific NBR nitrile rubbers having particular ion contents and ion indices and specific properties associated therewith both in the rubber and in the corresponding vulcanizates. Specific dodecyl mercaptans, for example that described in WO-A-2008/42037, can be used for molecular weight regulation in these processes. Accordingly, fragments of the regulator substances used are found in the polymer chains.

The production of butadiene/acrylonitrile copolymers in the presence of various primary, secondary and tertiary mercaptans was studied in J. Appl. Polym. Sci. 1968, Vol. 12, 1075-1095. A particular focus was the performance of the mercaptans in terms of their ability to control the molecular weight and the Mooney viscosity of the polymers. The poorest results were attained with n-alkyl mercaptans. By contrast, secondary mercaptans such as 2-nonyl mercaptan, 2-decyl mercaptan and mixtures proved to be more efficient regulators at low temperatures (5° C.). Tertiary $C_7$ to $C_{13}$ mercaptans showed the best results. Optimal transfer constants for a 70/30 butadiene/acetonitrile copolymer and an 80/20 butadiene/acetonitrile copolymer were obtained in a polymerization at 5° C. When using tert-nonyl mercaptan the polymerization was carried out up to a conversion of no more than 59%. No indication whatsoever is given as to the influence, if any, of the regulator substances analysed on the volatile substances content in the butadiene/acrylonitrile rubbers produced and the extent to which the other properties of the rubbers and vulcanizates based thereon are influenced.

In summary it can be stated that, to date, there are still no known measures by which mercaptans can be used as molecular weight regulators to obtain nitrile rubbers having a distinctly reduced volatile substances content and simultaneously a profile of properties which remains unchanged and good, particularly in terms of the vulcanizate properties.

SUMMARY OF THE INVENTION

It is an object of the present invention to provide nitrile rubbers which on subsequent processing give vulcanizates having a good profile of properties and which simultaneously have distinctly improved emission characteristics compared to nitrile rubbers produced exclusively using the molecular weight regulator TDM typically used in industry.

It was found that, surprisingly, nitrile rubbers having very good vulcanization characteristics and improved emission characteristics, and also vulcanizates based thereon having excellent vulcanizate properties, are obtained when the emulsion polymerization is carried out using specific molecular weight regulators and simultaneously the polymerization is conducted up to a conversion of 60% or more.

Consequently, the present invention provides a nitrile rubber comprising repeating units of at least one α,β- unsaturated nitrile monomer and at least one conjugated diene monomer and having an emission quotient E according to general formula (I) of less than or equal to 0.25 mg/(kg*Mooney units)

$$E = \frac{[\text{volatile constituents}]}{[\text{Mooney viscosity}]} \times \frac{[\text{nitrile content}]}{100} \quad (I)$$

where
[volatile constituents] is the volatile constituents concentration in mg/kg of nitrile rubber determined by TDS GC- MS analysis according to VDA recommendation 278 (version September 2002) between 28.4 min and 34.0 min,

[Mooney viscosity] is the Mooney viscosity ML 1+4 at 100° C. of the nitrile rubber in Mooney units determined according to ASTM D 1646 and

[nitrile content] is the α,β-unsaturated nitrile content in the nitrile rubber in % by weight determined pursuant to DIN 53 625 according to Kjeldahl.

The nitrile content is given dimensionless in general formula (I) (or in alternative expression "normalized"), this means the unit "% by weight" is not considered in general formula (I).

For the sake of clarity this means: Consequently, the present invention provides a nitrile rubber comprising repeating units of at least one α,β-unsaturated nitrile monomer and at least one conjugated diene monomer and having an emission quotient E according to general formula (I) of less than or equal to 0.25 mg/(kg*Mooney units)

$$E = \frac{[\text{volatile constituents}]}{[\text{Mooney viscosity}]} \times \frac{[\text{nitrile content}]}{100} \quad (I)$$

where

[volatile constituents] is the volatile constituents concentration in mg/kg of nitrile rubber determined by TDS GC-MS analysis according to VDA recommendation 278 (version September 2002) between 28.4 min and 34.0 min,

[Mooney viscosity] is the Mooney viscosity ML 1+4 at 100° C. of the nitrile rubber in Mooney units determined according to ASTM D 1646 and

[nitrile content] is the dimensionless α,β-unsaturated nitrile content in the nitrile rubber, wherein such content is determined in % by weight pursuant to DIN 53 625 according to Kjeldahl.

Furthermore, the present invention provides a process for producing nitrile rubbers by emulsion polymerization of at least one α,β-unsaturated nitrile monomer and at least one conjugated diene monomer, characterized in that the emulsion polymerization is carried out in the presence of tertiary nonyl mercaptan up to a conversion of at least 60% by weight based on the sum of the monomers employed.

The present invention further provides a vulcanizable mixture comprising the nitrile rubber according to the invention, a process for producing this vulcanizable mixture, vulcanizates based on this vulcanizable mixture and a process for producing such vulcanizates.

DETAILED DESCRIPTION OF THE INVENTION

Nitrile Rubber:

The nitrile rubber according to the invention has an emission quotient E according to general formula (I) of less than or equal to 0.25 mg/(kg*Mooney units), preferably less than or equal to 0.22 mg/(kg*Mooney units) and more preferably less than or equal to 0.20 mg/(kg*Mooney units)

$$E = \frac{[\text{volatile constituents}]}{[\text{Mooney viscosity}]} \times \frac{[\text{nitrile content}]}{100} \quad (I)$$

where

[volatile constituents] is the volatile constituents concentration in mg/kg of nitrile rubber determined by TDS GC-MS analysis according to VDA recommendation 278 (version September 2002) between 28.4 min and 34.0 min,

[Mooney viscosity] is the Mooney viscosity ML 1+4 at 100° C. of the nitrile rubber in Mooney units determined according to ASTM D 1646 and

[nitrile content] is the α,β-unsaturated nitrile content in the nitrile rubber in % by weight determined to DIN 53 625 according to Kjeldahl.

The nitrile content is given dimensionless in general formula (I) (or in alternative expression "normalized"), this means the unit "% by weight" is not considered in general formula (I).

For the sake of clarity this means: Consequently, the present invention provides a nitrile rubber comprising repeating units of at least one α,β-unsaturated nitrile monomer and at least one conjugated diene monomer and having an emission quotient E according to general formula (I) of less than or equal to 0.25 mg/(kg*Mooney units)

$$E = \frac{[\text{volatile constituents}]}{[\text{Mooney viscosity}]} \times \frac{[\text{nitrile content}]}{100} \quad (I)$$

where

[volatile constituents] is the volatile constituents concentration in mg/kg of nitrile rubber determined by TDS GC-MS analysis according to VDA recommendation 278 (version September 2002) between 28.4 min and 34.0 min,

[Mooney viscosity] is the Mooney viscosity ML 1+4 at 100° C. of the nitrile rubber in Mooney units determined according to ASTM D 1646 and

[nitrile content] is the dimensionless α,β-unsaturated nitrite content in the nitrile rubber, wherein such content is determined in % by weight pursuant to DIN 53 625 according to Kjeldahl.

The volatile constituents which have their concentration determined by TDS GC-MS analysis according to VDA recommendation 278 (version September 2002) between 28.4 min and 34.0 min are typically volatile constituents of the molecular weight regulator used.

The determination of the Mooney viscosity of the nitrile rubber (ML 1+4 at 100° C.) according to ASTM D 1646 is typically effected using noncalendered nitrile rubbers according to the invention.

Nitrile rubbers which were not polymerized using the specific molecular weight regulator and which were not polymerized up to conversions of at least 60% based on the sum of the monomers employed have distinctly poorer emission characteristics. Vulcanizates produced using the nitrile rubbers according to the invention no longer exhibit any odour nuisances whatsoever in the relevant applications, for example in floor coverings. The nitrile rubbers according to the invention simultaneously feature excellent vulcanization characteristics.

The nitrile rubbers according to the invention comprise repeating units of at least one α,β-unsaturated nitrile monomer and at least one conjugated diene monomer. The nitrile rubbers according to the invention can further comprise repeating units of one or more additional copolymerizable monomers.

The repeating units of the at least one conjugated diene preferably derive from ($C_4$-$C_6$) conjugated dienes or mixtures thereof. Particular preference is given to 1,2-butadiene, 1,3-butadiene, isoprene, 2,3-dimethylbutadiene, piperylene and mixtures thereof. Especially preferred are 1,3-butadiene, isoprene and mixtures thereof. Very particular preference is given to 1,3-butadiene.

The α,β-unsaturated nitrile used for production of the inventive nitrile rubbers can be any known α,β-unsaturated nitrile, preference being given to ($C_3$-$C_5$) α,β-unsaturated nitriles such as acrylonitrile, methacrylonitrile, ethacrylonitrile or mixtures thereof. Acrylonitrile is particularly preferred.

When one or more additional copolymerizable monomers are used, these can be, for example, aromatic vinyl monomers, preferably styrene, α-methylstyrene and vinylpyridine, fluorinated vinyl monomers, preferably fluoroethyl vinyl ether, fluoropropyl vinyl ether, o-fluoromethylstyrene, vinyl pentafluorobenzoate, difluoroethylene and tetrafluoroethylene, or else copolymerizable antiageing monomers, preferably N-(4-anilinophenyl)acrylamide, N-(4-anilinophenyl)methacrylamide, N-(4-anilinophenyl)cinnamides, N-(4-anilinophenyl)crotonamide, N-phenyl-4-(3-vinylbenzyloxy)aniline and N-phenyl-4-(4-vinylbenzyloxy)aniline, and also nonconjugated dienes, such as 4-cyanocyclohexene and 4-vinylcyclohexene, or else alkynes such as 1- or 2-butyne.

Furthermore, copolymerizable termonomers used can be monomers comprising hydroxyl groups, preferably hydroxyalkyl(meth)acrylates. However, it is also possible to use correspondingly substituted (meth)acrylamines.

Examples of useful hydroxyalkyl acrylate monomers include 2-hydroxyethyl(meth)acrylate, 2-hydroxypropyl (meth)acrylate, 3-hydroxypropyl(meth)acrylate, 3-chloro-2-hydroxypropyl(meth)acrylate, 3-phenoxy-2-hydroxypropyl (meth)acrylate, glyceryl mono(meth)acrylate, hydroxybutyl (meth)acrylate, 3-chloro-2-hydroxypropyl(meth)acrylate, hydroxyhexyl(meth)acrylate, hydroxyoctyl(meth)acrylate, hydroxymethyl(meth)acrylamide, 2-hydroxypropyl(meth) acrylate, 3-hydroxypropyl(meth)acrylamide, di(ethylene glycol)itaconate, di(propylene glycol)itaconate, bis(2-hydroxypropyl)itaconate, bis(2-hydroxyethyl)itaconate, bis(2-hydroxyethyl)fumarate, bis(2-hydroxyethyl)maleate and hydroxymethyl vinyl ketone.

Furthermore, copolymerizable termonomers used can be monomers comprising epoxy groups, preferably glycidyl (meth)acrylates.

Examples of monomers comprising epoxy groups include diglycidyl itaconate, glycidyl p-styrenecarboxylate, 2-ethylglycidyl acrylate, 2-ethylglycidyl methacrylate, 2-(n-propyl) glycidyl acrylate, 2-(n-propyl)glycidyl methacrylate, 2-(n-butyl)glycidyl acrylate, 2-(n-butyl)glycidyl methacrylate, glycidylmethyl acrylate, glycidylmethyl methacrylate, glycidyl acrylate, (3',4'-epoxyheptyl)-2-ethyl acrylate, (3',4'-epoxyheptyl)-2-ethyl methacrylate, 6',7'-epoxyheptyl acrylate, 6',7'-epoxyheptyl methacrylate, allyl glycidyl ether, allyl 3,4-epoxyheptyl ether, 6,7-epoxyheptyl allyl ether, vinyl glycidyl ether, vinyl 3,4-epoxyheptyl ether, 3,4-epoxyheptyl vinyl ether, 6,7-epoxyheptyl vinyl ether, o-vinylbenzyl glycidyl ether, m-vinylbenzyl glycidyl ether, p-vinylbenzyl glycidyl ether, 3-vinylcyclohexene oxide.

Alternatively, additional copolymerizable monomers used can be copolymerizable termonomers comprising carboxyl groups, for example α,β-unsaturated monocarboxylic acids, esters thereof, α,β-unsaturated dicarboxylic acids, mono- or diesters thereof or the corresponding anhydrides or amides thereof.

The α,β-unsaturated monocarboxylic acids used can preferably be acrylic acid and methacrylic acid.

It is also possible to use esters of the α,β-unsaturated monocarboxylic acids, preferably the alkyl esters and alkoxyalkyl esters thereof. Preference is given to the alkyl esters, in particular $C_1$-$C_{18}$ alkyl esters, of the α,β-unsaturated monocarboxylic acids, particular preference being given to alkyl esters, in particular $C_1$-$C_{18}$ alkyl esters, of acrylic acid or of methacrylic acid, in particular methyl acrylate, ethyl acrylate, propyl acrylate, n-butyl acrylate, tert-butyl acrylate, 2-ethylhexyl acrylate, n-dodecyl acrylate, methyl methacrylate, ethyl methacrylate, butyl methacrylate and 2-ethylhexyl methacrylate. Preference is also given to alkoxyalkyl esters of the α,β-unsaturated monocarboxylic acids, particular preference being given to alkoxyalkyl esters of acrylic acid or of methacrylic acid, in particular $C_2$-$C_{12}$-alkoxyalkyl esters of acrylic acid or of methacrylic acid, very particular preference being given to methoxymethyl acrylate, methoxyethyl(meth)acrylate, ethoxyethyl(meth)acrylate and methoxyethyl(meth)acrylate. It is also possible to use mixtures of alkyl esters, for example those mentioned hereinabove with alkoxyalkyl esters, for example in the form of those mentioned hereinabove. It is also possible to use cyanoalkyl acrylate and cyanoalkyl methacrylates in which the number of carbon atoms in the cyanoalkyl group is 2-12, preferably α-cyanoethyl acrylate, β-cyanoethyl acrylate and cyanobutyl methacrylate. It is also possible to use hydroxyalkyl acrylates and hydroxyalkyl methacrylates in which the number of carbon atoms of the hydroxyalkyl groups is 1-12, preferably 2-hydroxyethyl acrylate, 2-hydroxyethyl methacrylate and 3-hydroxypropyl acrylate; it is also possible to use acrylates or methacrylates comprising fluorine-substituted benzyl groups, preferably fluorobenzyl acrylate and fluorobenzyl methacrylate. It is also possible to use acrylates and methacrylates comprising fluoroalkyl groups, preferably trifluoroethyl acrylate and tetrafluoropropyl methacrylate. It is also possible to use amino-groups-containing α,β-unsaturated carboxylic esters such as dimethylaminomethyl acrylate and diethylaminoethyl acrylate.

It is further possible to use α,β-unsaturated dicarboxylic adds, preferably maleic acid, fumaric acid, crotonic acid, itaconic acid, citraconic acid and mesaconic acid as additional copolymerizable monomers.

It is further possible to use α,β-unsaturated dicarboxylic anhydrides, preferably maleic anhydride, itaconic anhydride, citraconic anhydride and mesaconic anhydride.

It is further possible to use mono- or diesters of α,β-unsaturated dicarboxylic acids.

These α,β-unsaturated dicarboxylic mono- or diesters can be, for example, alkyl, preferably $C_5$-$C_{10}$-alkyl, in particular ethyl, n-propyl, isopropyl, n-butyl, tert-butyl, n-pentyl or n-hexyl, alkoxyalkyl, preferably $C_2$-$C_{12}$-alkoxyalkyl, more preferably $C_3$-$C_5$-alkoxyalkyl, hydroxyalkyl, preferably $C_1$-$C_{12}$-hydroxyalkyl, more preferably $C_2$-$C_8$-hydroxyalkyl, cycloalkyl, preferably $C_5$-$C_{12}$-cycloalkyl, more preferably $C_6$-$C_{12}$-cycloalkyl, alkylcycloalkyl, preferably $C_6$-$C_{12}$-alkylcycloalkyl, more preferably $C_7$-$C_{10}$-alkylcycloalkyl, aryl, preferably $C_6$-$C_{14}$-aryl, mono- or diesters, wherein any diesters can also be mixed esters.

Particularly preferred alkyl esters of α,β-unsaturated monocarboxylic adds are methyl(meth)acrylate, ethyl(meth) acrylate, propyl(meth)acrylate, n-butyl(meth)acrylate, t-butyl(meth)acrylate, hexyl(meth)acrylate, 2-ethylhexyl(meth) acrylate, octyl(meth)acrylate, 2-propylheptyl acrylate and lauryl(meth)acrylate. In particular, n-butyl acrylate is used.

Particularly preferred alkoxyalkyl esters of the α,β-unsaturated monocarboxylic adds are methoxyethyl(meth) acrylate, ethoxyethyl(meth)acrylate and methoxyethyl (meth)acrylate. In particular, methoxyethyl acrylate is used.

Other α,β-unsaturated monocarboxylic acid esters used further include, for example, polyethylene glycol(meth)acrylate, polypropylene glycol(meth)acrylate, N-(2-hydroxyethyl)acrylamides, N-(2-hydroxymethyl)acrylamides and urethane(meth)acrylate.

Examples of α,β-unsaturated dicarboxylic monoesters include
  monoalkyl maleates, preferably monomethyl maleate, monoethyl maleate, monopropyl maleate and mono-n-butyl maleate;
  monocycloalkyl maleates, preferably monocyclopentyl maleate, monocyclohexyl maleate and monocycloheptyl maleate;
  monoalkylcycloalkyl maleates, preferably monomethylcyclopentyl maleate and monoethylcyclohexyl maleate;
  monoaryl maleates, preferably monophenyl maleate;
  monobenzyl maleates, preferably monobenzyl maleate;
  monoalkyl fumarates, preferably monomethyl fumarate, monoethyl fumarate, monopropyl fumarate and mono-n-butyl fumarate;
  monocycloalkyl fumarates, preferably monocyclopentyl fumarate, monocyclohexyl fumarate and monocycloheptyl fumarate;
  monoalkylcycloalkyl fumarates, preferably monomethylcyclopentyl fumarate and monoethylcyclohexyl fumarate;
  monoaryl fumarates, preferably monophenyl fumarate;
  a monobenzyl fumarates, preferably monobenzyl fumarate;
  monoalkyl citraconates, preferably monomethyl citraconate, monoethyl citraconate, monopropyl citraconate and mono-n-butyl citraconate;
  monocycloalkyl citraconates, preferably monocyclopentyl citraconate, monocyclohexyl citraconate and monocycloheptyl citraconate;
  monoalkylcycloalkyl citraconates, preferably monomethylcyclopentyl citraconate and monoethylcyclohexyl citraconate;
  monoaryl citraconates, preferably monophenyl citraconate;
  monobenzyl citraconates, preferably monobenzyl citraconate;
  monoalkyl itaconates, preferably monomethyl itaconate, monoethyl itaconate, monopropyl itaconate and mono-n-butyl itaconate;
  monocycloalkyl itaconates, preferably monocyclopentyl itaconate, monocyclohexyl itaconate and monocycloheptyl itaconate;
  monoalkylcycloalkyl itaconates, preferably monomethylcyclopentyl itaconate and monoethylcyclohexyl itaconate;
  monoaryl itaconates, preferably monophenyl itaconate;
  monobenzyl itaconates, preferably monobenzyl itaconate;
  monoalkyl mesaconates, preferably monoethyl mesaconate.

The α,β-unsaturated dicarboxylic diesters used can be the analogous diesters based on the monoester groups mentioned hereinabove and the ester groups can also be chemically different groups.

Useful additional copolymerizable monomers further include free-radically polymerizable compounds comprising at least two olefinic double bonds per molecule. Examples of polyunsaturated compounds include acrylates, methacrylates and itaconates of polyols, for example ethylene glycol diacrylate, diethylene glycol dimethacrylate, triethylene glycol diacrylate, butane-1,4-diol diacrylate, propane-1,2-diol diacrylate, butane-1,3-diol dimethacrylate, neopentyl glycol diacrylate, trimethylolpropane di(meth)acrylate, trimethylolethane di(meth)acrylate, glyceryl di- and triacrylate, pentaerythrityl di-, tri- and tetraacrylate and -methacrylate, dipentaerythrityl tetra-, penta- and hexaacrylate and -methacrylate and -itaconate, sorbityl tetraacrylate, sorbityl hexamethacrylate, diacrylates and dimethacrylates of 1,4-cyclohexanediol 1,4-dimethylolcyclohexane, 2,2-bis(4-hydroxyphenyl)propane, of polyethylene glycols and of oligoesters and oligourethanes having terminal hydroxyl groups. The polyunsaturated monomers used can also be acrylamides, for example methylenebisacrylamide, hexamethylene-1,6-bisacrylamide, diethylenetriaminetrismethacrylamide, bis(methacrylamidopropoxy)ethane or 2-acrylamidoethyl acrylate. Examples of polyunsaturated vinyl and allyl compounds include divinylbenzene, ethylene glycol divinyl ether, diallyl phthalate, allyl methacrylate, diallyl maleate, triallyl isocyanurate and triallyl phosphate.

The proportions of conjugated diene and α,β-unsaturated nitrile in the nitrile rubbers according to the invention can vary within wide limits. The proportion of or the proportion of the sum of the conjugated diene(s) is typically in the range of from 20% to 95% by weight, preferably in the range of from 45% to 90% by weight, more preferably in the range of from 50% to 85% by weight, based on the overall polymer. The proportion of or the proportion of the sum of the α,β-unsaturated nitrile(s) is typically 5% to 80% by weight, preferably 10% to 55% by weight, more preferably 15% to 50% by weight, based on the overall polymer. The proportions of the repeating units of conjugated diene and α,β-unsaturated nitrile in the nitrile rubbers according to the invention sum to 100% by weight in each case.

The additional monomers can be present in amounts of from 0% to 40% by weight, preferably κ% to 30% by weight, more preferably κ% to 26% by weight, based on the overall polymer. In this case, corresponding proportions of the repeating units of the conjugated diene(s) and/or of the repeating units of the α,β-unsaturated nitrile(s) are replaced by the proportions of these additional monomers and the proportions of all of the repeating units of the monomers must still add up to 100% by weight in each case.

When esters of (meth)acrylic acid are used as additional monomers, they are typically used in amounts of from 1% to 25% by weight. When α,β-unsaturated mono- or dicarboxylic acids are used as additional monomers, they are typically used in amounts of less than 10% by weight.

The nitrogen content in the nitrile rubbers of the invention is determined to DIN 53 625 according to Kjeldahl. Due to the polar comonomers content, the nitrile rubbers are typically ≥85% by weight soluble in methyl ethyl ketone at 20° C.

The nitrile rubbers have Mooney viscosities ML 1+4 at 100° C. of from 10 to 150 Mooney units (MU), preferably of from 20 to 100 MU.

The glass transition temperatures of the nitrile rubbers are in the range −70° C. to +10° C., preferably in the range −60° C. to 0° C.

Preference is given to nitrile rubbers according to the invention comprising repeating units of acrylonitrile, and 1,3-butadiene. Preference is further given to nitrile rubbers comprising repeating units of acrylonitrile, 1,3-butadiene and one or more additional copolymerizable monomers. Preference is likewise given to nitrile rubbers comprising repeating units of acrylonitrile, 1,3-butadiene and one or more α,β-unsaturated mono- or dicarboxylic acids or esters or amides thereof and, in particular, repeating units of an alkyl ester of an α,β-unsaturated carboxylic acid, most preferably of methyl(meth)acrylate, ethyl(meth)acrylate, propyl(meth)acrylate, n-butyl(meth)acrylate, t-butyl(meth) acrylate, hexyl(meth)acrylate, 2-ethylhexyl(meth)acrylate, octyl(meth)acrylate or lauryl(meth)acrylate.

Process for Producing the Nitrile Rubbers:

The nitrile rubbers are produced by emulsion polymerization in the process according to the invention.

Molecular Weight Regulator:

It is essential that the process for producing the nitrile rubbers according to the invention is carried out in the presence of tert-nonyl mercaptan as molecular weight regulator. This can be, for example, a) tert-nonyl mercaptan at a purity of at least 95% by weight, preferably at least 97% by weight, or b) a mixture comprising (i) at least 50% by weight but less than 95% by weight of tert-nonyl mercaptan and (ii) the remainder being one or more further isomeric nonyl mercaptans and/or one or more further $C_{10}$-$C_{16}$ alkylthiols.

The tert-nonyl mercaptan a) is commercially available, for example from Sigma Aldrich (CAS No. 25360-10-5) at a purity of at least 97% by weight or from Chevron Phillips as the product Sulfol® 90 at a purity of at least 97% by weight or from various chemicals producers.

Mixtures b) comprising at least 50% by weight but less than 95% by weight of tert-nonyl mercaptan and further on one or more further isomeric nonyl mercaptans and/or one or more further $C_{12}$-$C_{16}$ alkylthiols are likewise commercially available, for example as mercaptans 175 from Atofina having a tert-nonyl mercaptan content of 65% by weight and a dodecyl mercaptans content of 35% by weight or Sulfol® 100 from Chevron Phillips.

The molecular weight regulator used is typically used in the polymerization in an amount of from 0.05 to 3 parts by weight, preferably of from 0.1 to 1.5 parts by weight, based on 100 parts by weight of the monomer mixture. Suitable amounts can be determined in simple hand experiments by a person skilled in the art.

The metered addition of the molecular weight regulator or the molecular weight regulator mixture is effected either exclusively on commencement of the polymerization or on commencement and additionally portionwise over the course of the polymerization. In batch processes the total amount of the molecular weight regulator or the molecular weight regulator mixture is typically added at the beginning and when the process is carried out continuously incremental addition has proven advantageous. The molecular weight regulator or the regulator mixture is then typically added in at least two stages and addition in two, three or even more stages is possible. Even continuous addition over the total polymerization time is possible. It is particularly preferable to add the molecular weight regulator or the molecular weight regulator mixture in two stages. For a two-stage metered addition, it has proven advantageous to initially add the regulator/the regulator mixture, prior to commencement of the polymerization, in an amount of from 5% to 65% by weight, preferably 10% to 65% by weight, based on the total amount of regulator/regulator mixture, and the remaining amount of regulator/regulator mixture in a subsequent metered addition at a conversion of from 5% to 80%, preferably 10% to 55%, based on the total amount of monomers employed. For three-stage and multistage metered addition, it is advisable to determine the most favourable amount of molecular weight regulator and the most favourable time for addition by suitable preliminary experiments.

On account of its function, the molecular weight regulator is found to a certain extent in the form of end groups in the nitrile rubber, i.e., the nitrile rubber comprises the corresponding alkylthio end groups to a certain extent.

Emulsifiers:

Emulsifiers used can be water-soluble salts of anionic emulsifiers or else uncharged emulsifiers. It is preferable to use anionic emulsifiers.

Anionic emulsifiers used can be modified resin acids obtained by dimerization, disproportionation, hydrogenation and modification of resin acid mixtures comprising abietic acid, neoabietic acid, palustric acid, levopimaric acid. A particularly preferred modified resin acid is disproportionated resin acid (Ullmann's Encyclopedia of Industrial Chemistry, 6th edition, volume 31, p. 345-355).

Anionic emulsifiers used can also be fatty acids. These comprise 6 to 22 carbon atoms per molecule. They can be fully saturated or can comprise one or more double bonds in the molecule. Examples of fatty acids include caproic acid, lauric acid, myristic acid, palmitic acid, stearic acid, oleic acid, linoleic acid, linolenic acid. The carboxylic acids are typically based on origin-specific oils or fats, for example castor oil, cottonseed, peanut oil, linseed oil, coconut fat, palm kernel oil, olive oil, rapeseed oil, soya oil, fish oil and bovine tallow etc. (Ullmann's Encyclopedia of Industrial Chemistry, 6th edition, volume 13, p. 75-108). Preferred carboxylic acids derive from coconut fatty acid and from bovine tallow and are partly or fully hydrogenated.

Such carboxylic acids based on modified resin acids or fatty acids are used in the form of water-soluble salts of lithium, sodium, potassium and ammonium. The sodium and potassium salts are preferred.

Anionic emulsifiers are, furthermore, sulphonates, sulphates and phosphates bonded to an organic radical. Useful organic radicals are aliphatic, aromatic, alkylated aromatic systems, fused aromatic systems and methylene-bridged aromatic systems and the methylene-bridged and fused aromatic systems may additionally be alkylated. The length of the alkyl chains is 6 to 25 carbon atoms. The length of the alkyl chains bonded to the aromatic systems is between 3 and 12 carbon atoms.

The sulphates, sulphonates and phosphates are used in the form of salts of lithium, sodium, potassium and ammonium. The salts of sodium, potassium and ammonium are preferred.

Examples of sulphonates, sulphates and phosphates of this type include sodium laurylsulphate, sodium alkylsulphonate, sodium alkylarylsulphonate, sodium salts of methylene-bridged arylsulphonates, sodium salts of alkylated naphthalenesulphonates, and the sodium salts of methylene-bridged naphthalenesulphonates, which may also be oligomerized, the oligomerization level being between 2 and 10. Typically, the alkylated naphthalenesulphonic acids and the methylene-bridged (and optionally alkylated) naphthalenesulphonic acids are in the form of isomer mixtures which can also comprise more than 1 sulphonic acid group (2 to 3 sulphonic acid groups) in the molecule. Particular preference is given to sodium laurylsulphate, sodium alkylsulphonate mixtures having 12 to 18 carbon atoms, sodium alkylarylsulphonates, sodium diisobutylenenaphthalenesulphonate, methylene-bridged polynaphthalenesulphonate mixtures and methylene-bridged arylsulphonate mixtures.

Uncharged emulsifiers derive from addition products of ethylene oxide and propylene oxide onto compounds having sufficiently acidic hydrogen. These include, for example, phenol, alkylated phenol and alkylated amines. The mean polymerization levels of the epoxides are between 2 and 20.

Examples of uncharged emulsifiers are ethoxylated nonylphenols having 8, 10 and 12 ethylene oxide units. The uncharged emulsifiers are typically not used alone, but rather in combination with anionic emulsifiers.

Preference is given to the sodium and potassium salts of disproportionated abietic acid and of partly hydrogenated tallow fatty acid and mixtures thereof, sodium laurylsulphate, sodium alkylsulphonates, sodium alkylbenzenesulphonate, and alkylated and methylene-bridged naphthalenesulphonic acids.

The emulsifiers are used in an amount of from 0.2 to 15 parts by weight, preferably 0.5 to 12.5 parts by weight, more preferably 1.0 to 10 parts by weight, based on 100 parts by weight of the monomer mixture.

The emulsion polymerization is carried out using the emulsifiers mentioned. When, on completion of the polymerization, lattices having a tendency to self-coagulate prematurely on account of a certain instability are obtained, said emulsifiers can also be used for post-stabilization of the lattices. This may become necessary particularly prior to the removal of unconverted monomers by treatment with steam and prior to latex storage.

Polymerization Initiators:

The emulsion polymerization is typically initiated using polymerization initiators which break down to free radicals. These include compounds comprising an —O—O— unit (peroxo compounds) or an —N=N— unit (azo compound).

Peroxo compounds include hydrogen peroxide, peroxodisulphates, peroxodiphosphates, hydroperoxides, peracids, peresters, peracid anhydrides and peroxides having two organic radicals. Useful salts of peroxodisulphuric acid and peroxodiphosphoric acid are the sodium, potassium and ammonium salts. Useful hydroperoxides are, for example, t-butyl hydroperoxide, cumene hydroperoxide and p-menthane hydroperoxide. Useful peroxides having two organic radicals are dibenzoyl peroxide, 2,4-dichlorobenzoyl peroxide, di-t-butyl peroxide, dicumyl peroxide, t-butyl perbenzoate, t-butyl peracetate etc. Useful azo compounds are azobisisobutyronitrile, azobisvaleronitrile and azobiscyclohexanenitrile.

Hydrogen peroxide, hydroperoxides, peracids, peresters, peroxodisulphate and peroxodiphosphate are also used in combination with reducing agents. Useful reducing agents are sulphenates, sulphinates, sulphoxylates, dithionite, sulphite, metabisulphite, disulphite, sugar, urea, thiourea, xanthates, thioxanthates, hydrazinium salts, amines and amine derivatives such as aniline, dimethylaniline, monoethanolamine, diethanolamine or triethanolamine. Initiator systems consisting of an oxidizing agent and a reducing agent are known as redox systems. When redox systems are used, salts of transition metal compounds such as iron, cobalt or nickel are often additionally used in combination with suitable complexing agents such as sodium ethylenediaminetetraacetate, sodium nitrilotriacetate and trisodium phosphate or tetrapotassium diphosphate.

Preferred redox systems are, for example:
1) potassium peroxydisulphate in combination with triethanolamine,
2) ammonium peroxydiphosphate in combination with sodium metabisulphite ($Na_2S_2O_5$),
3) p-menthane hydroperoxide/sodium formaldehydesulphoxylate in combination with iron-II-sulphate ($FeSO_4*7H_2O$), sodium ethylenediaminoacetate and trisodium phosphate;
4) cumene hydroperoxide/sodium formaldehydesulphoxylate in combination with iron-II-sulphate ($FeSO_4*7H_2O$), sodium ethylenediaminoacetate and tetrapotassium diphosphate.
5) pinane hydroperoxide/sodium formaldehydesulphoxylate in combination with iron-II-sulphate ($FeSO_4*7H_2O$), sodium ethylenediaminoacetate and trisodium phosphate.

The amount of oxidizing agents is 0.001 to 1 part by weight based on 100 parts by weight of monomer. The molar amount of reducing agent is between 50% and 500% based on the molar amount of the oxidizing agent employed.

The molar amount of complexing agent is based on the amount of transition metal employed and is typically equimolar therewith.

To carry out the polymerization, all or individual components of the initiator system are metered on commencement of the polymerization or during the polymerization.

Portionwise addition of all and individual components of the activator system during the polymerization is preferred. Sequential addition can be used to control the reaction rate.

The polymerization time is in the range of from 5 h to 15 h and depends substantially on the acrylonitrile content of the monomer mixture and on the polymerization temperature.

The polymerization temperature is in the range of from 0 to 30° C., preferably of from 5 to 25° C.

It is essential for obtaining the nitrile rubbers according to the invention that the polymerization is carried out up to a conversion of at least 60% based on the monomer mixture employed. The polymerization is preferably carried out up to a conversion in the range of from 60% to 98%, more preferably 62% to 95%, in particular 65% to 95%. On attainment of this conversion the polymerization is stopped.

A stopper is added to the reaction mixture for this purpose. Useful for this purpose are, for example, dimethyl dithiocarbamate, sodium nitrite, mixtures of dimethyl dithiocarbamate and sodium nitrite, hydrazine and hydroxylamine and salts derived therefrom, such as hydrazinium sulphate and hydroxylammonium sulphate, diethylhydroxylamine, diisopropylhydroxylamine, water-soluble salts of hydroquinone, sodium dithionite, phenyl-α-naphthylamine and aromatic phenols such as tert-butylcatechol, or phenothiazine.

The amount of water employed in the emulsion polymerization is in the range of from 100 to 900 parts by weight, preferably in the range of from 120 to 500 parts by weight, more preferably in the range of from 150 to 400 parts by weight of water, based on 100 parts by weight of the monomer mixture.

Salts can be added to the aqueous phase during the emulsion polymerization to reduce the viscosity during the polymerization, for pH adjustment and as a pH buffer. Typical salts are salts of monovalent metals in the form of potassium hydroxide and sodium hydroxide, sodium sulphate, sodium carbonate, sodium hydrogencarbonate, sodium chloride and potassium chloride. Sodium hydroxide and potassium hydroxide, sodium hydrogencarbonate and potassium chloride are preferred. The amounts of these electrolytes are in the range 0 to 1 part by weight, preferably 0 to 0.5 part by weight, based on 100 parts by weight of the monomer mixture.

The polymerization can be performed either batchwise or else continuously in a stirred tank cascade.

To achieve smooth progress of the polymerization, only some of the initiator system is employed for the start of the polymerization and the remainder is metered in subsequently during the polymerization. The polymerization is typically commenced with 10% to 80% by weight, preferably 30-50% by weight, of the total amount of initiator. Subsequent metered addition of individual constituents of the initiator system is also possible.

If the intention is to produce chemically homogeneous products, acrylonitrile or butadiene is subsequently metered in when the composition is intended to be outside the azeotropic butadiene/acrylonitrile ratio. Subsequent metered addition is preferred for NBR types having acrylonitrile contents of from 10% to 34% by weight and for the types having 40% to 50% by weight of acrylonitrile (W. Hofmann, "Nitilkautschuk" ["Nitrile rubber"], Berliner Union, Stuttgart, 1965, page 58-66). The subsequent metered addition is preferably effected—as specified in DD 154 702 for example—under computer control on the basis of a computer program.

To remove unconverted monomers, the "stopped" latex can be subjected to a steam distillation. In this case, temperatures in the range of from 70° C. to 150° C. are used, the pressure being reduced for temperatures of <100° C. Post-stabilization of the latex with emulsifier can be effected prior to the steam distillation. To this end, it is advantageous to use the emulsifiers mentioned hereinabove in amounts of from 0.1% to 2.5% by weight, preferably 0.5% to 2.0% by weight, based on 100 parts by weight of nitrile rubber.

Latex Coagulation:

Prior to or during latex coagulation, one or more ageing stabilizers can be added to the latex. Phenolic, aminic and also other ageing stabilizers are suitable for this purpose.

Useful phenolic ageing stabilizers are alkylated phenols, styrenated phenol, sterically hindered phenols such as 2,6-di-tert-butylphenol, 2,6-di-tert-butyl-p-cresol (BHT), 2,6-di-tert-butyl-4-ethylphenol, sterically hindered phenols comprising ester groups, sterically hindered phenols containing thioether groups, 2,2'-methylenebis(4-methyl-6-tert-butyl-phenol) (BPH) and sterically hindered thiobisphenols.

When discolouration of the rubber is unimportant, aminic ageing stabilizers, for example mixtures of diaryl-p-pheylenediamines (DTPD), octylated diphenylamine (ODPA), phenyl-α-naphthylamine (PAN), phenyl-β-naphthylamine (PBN), preferably those based on phenylenediamine are also used. Examples of phenylendiamines include N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD), N,N'-bis-1,4-(1,4-dimethylpentyl)-p-phenylenediamine (77PD) etc.

Other ageing stabilizers include phosphites such as tris (nonylphenyl) phosphite, polymerized 2,2,4-trimethyl-1,2-dihydroquinoline (TMQ), 2-mercaptobenzimidazole (MBI), methyl-2-mercaptobenzimidazole (MMBI), zinc methylmercaptobenzimidazole (ZMMBI). The phosphites are often used in combination with phenolic ageing stabilizers. TMQ, MBI and MMBI are mostly used for NBR types which are vulcanized using peroxides.

For coagulation, the latex is adjusted to a pH known to a person skilled in the art, namely by addition of a base, preferably ammonia or sodium hydroxide or potassium hydroxide, or an acid, preferably sulphuric acid or acetic acid.

In one embodiment of the process, the coagulation is carried out using at least one salt selected from the group consisting of the salts of aluminium, calcium, magnesium, sodium, potassium and lithium. Mono- or divalent anions are typically used as anions of these salts. Halides are preferred and chloride, nitrate, sulphate, hydrogencarbonate, carbonate, formate and acetate are particularly preferred.

Useful are, for example, sodium chloride, potassium chloride, calcium chloride, magnesium chloride, sodium nitrate, potassium nitrate, sodium sulphate, potassium sulphate, sodium hydrogencarbonate, potassium hydrogencarbonate, sodium carbonate, potassium carbonate, aluminium sulphate, potassium aluminium sulphate (potassium alum), sodium aluminium sulphate (sodium alum), sodium acetate, calcium acetate and calcium formate. When a water-soluble calcium salt is used for the latex coagulation, calcium chloride is preferred.

The salts are added in an amount of from 0.05% to 10% by weight, preferably 0.5% to 8% by weight, more preferably 1% to 5% by weight, based on the solids content of the latex dispersion.

In addition to at least one salt from the group defined hereinabove, precipitants may also be used in the coagulation. Useful precipitants are water-soluble polymers for example. These are nonionic, anionic or cationic.

Examples of nonionic polymeric precipitants include modified cellulose such as hydroxyalkylcellulose or methylcellulose and adducts of ethylene oxide and propylene oxide onto compounds comprising acidic hydrogen. Examples of compounds comprising acidic hydrogen include: fatty acids, sugars such as sorbitol, mono- and diglycerides of fatty acids, phenol, alkylated phenols, (alkyl) phenol-formaldehyde condensates etc. The addition products of ethylene oxide and propylene oxide onto these compounds can have a random and block structure. Of these products, those which become less soluble with increasing temperature are preferred. Characteristic cloud points are in the range 0 to 100° C., preferably in the range of from 20 to 70° C.

Examples of anionic polymeric precipitants are the homo- and co-polymers of methacrylic acid, maleic acid, maleic anhydride etc. The sodium salt of polyacrylic acid is preferred.

Cationic polymeric precipitants are typically based on polyamines and on homo- and co-polymers of (meth)acrylamide. Preference is given to polymethacrylamides and polyamines, particularly those based on epichlorohydrin and dimethylamine. The amounts of polymeric precipitants are 0.01 to 5 parts by weight, preferably 0.05 to 2.5 parts by weight, to 100 parts by weight of nitrile rubber.

It is also conceivable to use other precipitants. However, it is possible to carry out the process according to the invention in the absence of additional precipitants without problems.

The latex used for coagulation advantageously has a solids concentration in the range of from 1% to 40%, preferably in the range of from 5% to 35% and more preferably in the range of from 15% to 30% by weight.

The latex coagulation is carried out in the temperature range of from 10 to 110° C., preferably of from 20 to 100° C., more preferably of from 50 to 98° C. The latex coagulation can be effected continuously or batchwise, preferably continuously.

In an alternative embodiment, the latex, which has typically been separated off from unconverted monomers, can also be treated with acids at a pH in the range of ≤6, preferably ≤4, more preferably 2, which causes the polymer to precipitate out. All mineral and organic acids allowing the selected pH ranges to be established can be used for the precipitation. It is preferable to use mineral acids to adjust the pH. The polymer is subsequently separated off from the suspension in the manner customary to a person skilled in the art. This too can be effected continuously or batchwise, preferably continuously.

Washing and Drying the Coagulated Nitrile Rubber:

Following coagulation, the nitrile rubber is typically in the form of what is known as crumb. Washing the coagulated NBR is therefore also described as crumb washing. This washing can use either deionized water or non-deionized water. Washing is carried out at a temperature in the range of from 15° C. to 90° C., preferably at a temperature in the range of from 20° C. to 80° C. The amount of washing water is 0.5 to 20 parts by weight, preferably 1 to 10 parts by weight and more preferably 1 to 5 parts by weight, based on 100 parts by weight of nitrile rubber. The rubber crumb is preferably subjected to multistage washing and the rubber crumb is partially dewatered between the individual washing stages. The residual moistures of the crumb between the individual washing stages are in the range of from 5% to 50% by weight, preferably in the range of from 7% to 25% weight. The number of washing stages is typically 1 to 7, preferably 1 to 3. Washing is carried out batchwise or continuously. It is preferable to use a multistage continuous process and countercurrent washing is preferred for the sparing use of water. It has proven advantageous to dewater the nitrile rubber crumb once washing has been completed. Drying of the predewatered nitrile rubber is effected in a dryer and useful dryers include moving-bed dryers and plate dryers for example. The temperatures on drying are 80° C. to 150° C. Preference is given to drying with a temperature programme, wherein the temperature is reduced towards the end of the drying process.

The invention further provides vulcanizable mixtures comprising at least one nitrile rubber according to the invention and at least one crosslinker. It is preferable for these vulcanizable mixtures to further comprise at least one filler. Furthermore, one or more additional typical rubber additives can be added to the mixtures.

The production of these vulcanizable mixtures is effected by mixing at least one nitrile rubber according to the invention and at least one crosslinker. When one or more fillers and/or one or more further additives are used, these are also admixed.

Useful crosslinkers are, for example, peroxidic crosslinkers such as bis(2,4-dichlorobenzyl) peroxide, dibenzoyl peroxide, bis(4-chlorobenzoyl) peroxide, 1,1-bis(t-butylperoxy)-3,3,5-trimethylcyclohexane, tert-butyl perbenzoate, 2,2-bis(t-butylperoxy)butene, 4,4-di-tert-butyl peroxynonylvalerate, dicumyl peroxide, 2,5-dimethyl-2,5-di(t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxy)-3-hexyne.

It can be advantageous also to use, in addition to these peroxidic crosslinkers, further additions which can help to increase the crosslinking yield: Useful for this purpose are, for example, triallyl isocyanurate, triallyl cyanurate, trimethylolpropane tri(meth)acrylate, triallyltrimellitate, ethylene glycol dimethacrylate, butanediol dimethacrylate, trimethylolpropane trimethacrylate, zinc diacrylate, zinc dimethacrylate, 1,2-polybutadiene or N,N'-m-phenylenedimaleimide.

The total amount of crosslinker(s) is typically in the range of from 1 to 20 phr, preferably in the range of from 1.5 to 15 phr and more preferably in the range of from 2 to 10 phr, based on the nitrile rubber.

The crosslinkers used can also be sulphur in elemental soluble or insoluble form, or sulphur donors.

Useful sulphur donors include, for example, dimorpholyl disulphide (DTDM), 2-morpholinodithiobenzothiazole (MBSS), caprolactam disulphide, dipentamethylenethiuram tetrasulphide (DPTT) and tetramethylthiuram disulphide (TMTD).

Also in the sulphur vulcanization of the nitrile rubbers according to the invention, it is possible to use yet further additions which can help to increase the crosslinking yield. In principle however, the crosslinking can also be effected with sulphur or sulphur donors alone.

Conversely, crosslinking of the nitrile rubbers according to the invention can, however, also be effected only in the presence of the additions mentioned hereinabove, i.e. without addition of elemental sulphur or sulphur donors.

Useful additions which can help to increase the crosslinking yield are, for example, dithiocarbamates, thiurams, thiazoles, sulphenamides, xanthates, guanidine derivatives, caprolactams and thiourea derivatives.

Dithiocarbamates used can be, for example: ammonium dimethyldithiocarbamate, sodium diethyldithiocarbamate (SDEC), sodium dibutyldithiocarbamate (SDBC), zinc dimethyldithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (Z5MC), tellurium diethyldithiocarbamate, nickel dibutyldithiocarbamate, nickel dimethyldithiocarbamate and zinc diisononyldithiocarbamate.

Thiurams used can be, for example, tetramethylthiuram disulphide (TMTD), tetramethylthiuram monosulphide (TMTM), dimethyldiphenylthiuram disulphide, tetrabenzylthiuram disulphide, dipentamethylenethiuram tetrasulphide or tetraethylthiuram disulphide (TETD).

Thiazoles used can be, for example, 2-mercaptobenzothiazole (MBT), dibenzothiazyl disulphide (MBTS), zinc mercaptobenzothiazole (ZMBT) or copper 2-mercaptobenzothiazole.

Sulphenamide derivatives used can be, for example, N-cyclohexyl-2-benzothiazylsulphenamide (CBS), N-tert-butyl-2-benzothiazylsulphenamide (TBBS), N,N'-dicyclohexyl-2-benzothiazylsulphenamide (DCBS), 2-morpholinothiobenzothiazole (MBS), N-oxydiethylenethiocarbamyl-N-tert-butylsulphenamide or oxydiethylenethiocarbamyl-N-oxyethylenesulphenamide.

Xanthates used can be, for example, sodium dibutylxanthate, zinc isopropyldibutylxanthate or zinc dibutylxanthate.

Guanidine derivatives used can be, for example, diphenylguanidine (DPG), di-o-tolylguanidine (DOTG) or o-tolylbiguanide (OTBG).

Dithiophosphates used can be, for example, zinc dialkyldithiophosphates (chain length of the alkyl radicals of $C_2$ to $C_{16}$), copper dialkyldithiophosphates (chain length of the alkyl radicals of $C_2$ to $C_{16}$) or dithiophosphorylpolysulfide.

A caprolactam used can be, for example, dithiobiscaprolactam.

Thiourea derivatives used can be, for example, N,N'-diphenylthiourea (DPTU), diethylthiourea (DETU) and ethylenethiourea (ETU).

Equally useful as additions are, for example, zinc diaminodiisocyanate, hexamethylenetetramine, 1,3-bis(citraconimidomethyl)benzene and cyclic disulphanes.

The additions and crosslinking agents mentioned can be used either individually or in mixtures. It is preferable to use the following substances for crosslinking the nitrile rubbers: sulphur, 2-mercaptobenzothiazole, tetramethylthiuram disulphide, tetramethylthiuram monosulphide, zinc dibenzyldithiocarbamate, dipentamethylenethiuram tetrasulphide, zinc dialkyldithiophosphate, dimorpholyl disulphide, tellurium diethyldithiocarbamate, nickel dibutyldithiocarbamate, zinc dibutyldithiocarbamate, zinc dimethyldithiocarbamate and dithiobiscaprolactam.

The crosslinking agents and aforementioned additions can each be used in amounts of from about 0.05 to 10 phr, preferably 0.1 to 8 phr, in particular 0.5 to 5 phr (single dose, based in each case on the active substance).

In the sulphur crosslinking according to the invention, it may also be useful, in addition to the crosslinking agents and additions mentioned hereinabove, to use further inorganic or organic substances as well, such as zinc oxide, zinc carbonate, lead oxide, magnesium oxide, saturated or unsaturated organic fatty acids and zinc salts thereof, polyalcohols, amino alcohols, for example triethanolamine, and amines, for example dibutylamine, dicyclohexylamine, cyclohexylethylamine and polyether amines.

In addition, it is also possible to use scorch retardants. These include cyclohexylthiophthalimide (CTP), N,N'-dinitrosopentamethylenetetramine (DNPT), phthalic anhydride (PTA) and diphenylnitrosamine. Preference is given to cyclohexylthiophthalimide (CTP).

In addition to the addition of the crosslinker(s), the nitrile rubber according to the invention can also be mixed with other typical rubber additives.

These include, for example, the typical substances known to a person skilled in the art, such as fillers, filler activators, antiozonants, ageing stabilizers, antioxidants, processing aids, extender oils, plasticizers, reinforcing materials and mould release agents.

Fillers used can be, for example, carbon black, silica, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form) or silicates.

Useful filler activators are, in particular, organic silanes for example vinyltrimethyloxysilane, vinyldimethoxymethylsilane, vinyltriethoxysilane, vinyltris(2-methoxyethoxy) silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Further filler activators are, for example, surface-active substances such as triethanolamine and ethylene glycols having molecular weights of 74 to 10 000 g/mol. The amount of filler activators is typically 0 to 10 phr, based on 100 phr of the nitrile rubber.

Ageing stabilizers which can be added to the vulcanizable mixtures are those already described in this application in connection with latex coagulation. They are typically used in amounts of about 0 to 5 phr, preferably 0.5 to 3 phr, based on 100 phr of the nitrile rubber.

Useful mould release agents are, for example, saturated or partly unsaturated fatty acids and oleic acids and derivatives thereof (fatty acid esters, fatty acid salts, fatty alcohols, fatty acid amides), which are preferably used as a mixture constituent, and furthermore products applicable to the mould surface, for example products based on low molecular weight silicone compounds, products based on fluoropolymers and products based on phenol resins.

The mould release agents are used as a mixture constituent in amounts of from about 0 to 10 phr, preferably 0.5 to 5 phr, based on 100 phr of the nitrile rubber.

Also possible is reinforcement with strengthening agents (fibres) of glass, according to the teaching of U.S. Pat. No. 4,826,721, and reinforcement by cords, woven fabrics, fibres made of aliphatic and aromatic polyamides (Nylon®, Aramid®), polyesters and natural fibre products.

The mixing of the components for the purpose of producing the vulcanizable mixtures is typically effected either in an internal mixer or on a roll. Internal mixers used are typically those having what is known as an "intermeshing" rotor geometry. At the starting time, the internal mixer is charged with the nitrile rubber according to the invention. Said rubber is typically in bale form and is then initially comminuted. After a suitable period, which can be determined by a person skilled in the art without difficulty, the crosslinker, the filler(s) and additives are added. The mixing is effected under temperature control with the proviso that the mixture remains at a temperature in the range of from 100° C. to 150° C. for a suitable time. After a further suitable mixing period, further mixture constituents are added, for example antioxidants, plasticizers, white pigments (e.g. titanium dioxide), colourants and other processing aids. After a further suitable mixing period, the internal mixer is vented and the shaft is cleaned. After a further period, the internal mixer is emptied to obtain the vulcanizable mixture. All the aforementioned periods are typically in the region of a few minutes and can be determined by the person skilled in the art without difficulty depending on the mixture to be produced. If rolls are used as mixing units, it is possible to proceed in an analogous manner and sequence for the metered addition.

The invention further provides a process for producing vulcanizates based on the nitrile rubbers according to the invention, characterized in that the vulcanizable mixtures comprising the nitrile rubber according to the invention are subjected to vulcanization. The vulcanization is typically effected at temperatures in the range of from 100° C. to 200° C., preferably at temperatures of from 120° C. to 190° C. and most preferably of from 130° C. to 180° C.

To this end, the vulcanizable mixture is subjected to further processing by means of extruders, injection moulding systems, rolls or calendars. The preformed mass thus obtainable is then typically vulcanized to completion in presses, autoclaves, hot air systems, or in what are known as automatic mat vulcanization systems, temperatures in the range of from 120° C. to 200° C., preferably 140° C. to 190° C., having proven advantageous. The vulcanization time is typically 1 minute to 24 hours and preferably 2 minutes to 1 hour. Depending on the shape and size of the vulcanizates, a second vulcanization by reheating may be necessary to attain complete vulcanization.

The invention accordingly provides the vulcanizates thus obtainable, based on the nitrile rubbers according to the invention. These vulcanizates may take the form of a drive belt, of roll coverings, of a seal, of a cap, of a stopper, of a hose, of floor covering, of sealing mats or sheets, of profiles or of membranes. Specifically, the vulcanizates can be an O-ring seal, a flat seal, a shaft sealing ring, a gasket sleeve, a sealing cap, a dust protection cap, a connector seal, a thermal insulation hose (with or without added PVC), an oil cooler hose, an air suction hose, a power steering hose, a shoe sole or parts thereof, or a pomp membrane. The nitrile rubbers according to the invention having a low emission quotient are very particularly suitable for producing floor coverings.

EXAMPLES

I Determining the Volatile Constituents Content

The volatile constituents emissions within the meaning of formula (I) are detected in a TDS GC-MS analysis according to VDA recommendation 278 (version September 2002) between 28.4 and 34.0 min and related to an emission of "mg/kg of nitrile rubber". A separating column DB-5MS of 60 m×0.25 mm, 1.00 μm (5% phenyl)-methylsiloxane was used; oven temperature 40° C. 1 min to 280° C., 5° C./min.

II Production of Nitrile Rubbers A to J

Inventive Examples and Comparative Examples

Nitrile rubbers A to J used in the examples which follow were produced with the formulations and polymerization conditions specified in Table 1 and all starting materials are specified in parts by weight based on 100 parts by weight of the monomer mixture.

The polymerization was effected batchwise in a 5 l autoclave with stirrer. For each of the autoclave batches, 1.25 kg of the monomer mixture, a total amount of water of 2.1 kg and EDTA in an equimolar amount based on the Fe(II) were employed. 1.9 kg of the amount of water were initially charged into the autoclave with the emulsifier and purged with a nitrogen stream. Thereafter, the destabilized monomers and the amount specified in Table 1 of the inventive molecular weight regulator or the noninventive molecular weight regulator were added and the reactor was sealed. Following thermostating of the reactor contents, the polymerizations were commenced by adding aqueous solutions of iron (II) salts (in the form of premixed solutions) and of para-menthanehydroperoxide (Trigonox® NT50). The premixed solution comprised 0.986 g of $Fe(II)SO_4 \cdot 7H_2O$ and 2.0 g of Rongalite C to 400 g of water.

The course of the polymerization was monitored by gravimetric determinations of conversion. On attainment of the conversions specified in Table 1, the polymerization was stopped by adding an aqueous solution of diethylhydroxylamine. Unconverted monomers were removed by means of steam distillation.

Prior to coagulation of the respective NBR latex, said latex was in each case admixed with a 50% strength dispersion of Vulkanox® BKF (0.3% by weight of Vulkanox® BKF based on NBR solids). The latex was subsequently coagulated, washed and the crumb obtained was dried.

The dried NBR rubbers were characterized by Mooney viscosity ML 1+4@ 100° C. according to ASTM D 1646 and by the ACN content. Furthermore, the volatile constituents content required for the calculation of the emission quotient E according to formula (I) was determined as specified hereinabove under point I.

TABLE 1

| Nitrile rubber | A Comparison | B Comparison | C Comparison | D Comparison | E | F Comparison | G | H Comparison | I | J |
|---|---|---|---|---|---|---|---|---|---|---|
| Butadiene [% by weight based on sum of monomers] (total/increment[1]) | 65 | 65 | 65 | 65 | 65 | 73 | 73 | 36/10 | 36/10 | 36/10 |
| Acrylonitrile [% by weight based on sum of monomers] (total/increment[2]) | 35/9 | 35/9 | 35/9 | 35/9 | 35/9 | 27/9 | 27/9 | 64 | 64 | 64 |
| Total amount of water | 200 | 200 | 200 | 200 | 200 | 170 | 170 | 170 | 170 | 170 |
| Oleic acid | 1.5 | 1.5 | 1.5 | 1.5 | 1.5 | 1.4 | 1.4 | 1.4 | 1.4 | 1.4 |
| Resin acid[3] | 0.6 | 0.6 | 0.6 | 0.6 | 0.6 | 0.6 | 0.6 | 0.6 | 0.6 | 0.6 |
| AOS[4] | 0.2 | 0.2 | 0.2 | 0.2 | 0.2 | 0.4 | 0.4 | 0.4 | 0.4 | 0.4 |
| Sulfole ® 120 (TDM)[5] (total/increment[2]) | 0.650/ 0.228 | | | 0.650/ 0.230 | | 0.420 | | 0.600 | | |
| Sulfole ® 100[6] (total/increment[2]) | | 0.400/ 0.140 | | | 0.450/ 0.158 | | | | 0.420 | |
| Sulfole ® 90[7] (total/increment[2]) | | | 0.350/ 0.123 | | | | 0.250 | | | 0.385 |
| p-Menthane hydroperoxide | 0.02 | 0.02 | 0.02 | 0.02 | 0.02 | 0.02 | 0.02 | 0.02 | 0.02 | 0.02 |
| Premixed $FeSO_4$[8] | 0.05 | 0.05 | 0.05 | 0.05 | 0.05 | 0.015 | 0.015 | 0.090 | 0.075 | 0.075 |
| Diethylhydroxylamine | 0.4 | 0.4 | 0.4 | 0.4 | 0.4 | 0.15 | 0.15 | 0.15 | 0.15 | 0.15 |
| Vulkanox ® BKF[9] | 0.3 | 0.3 | 0.3 | 0.3 | 0.3 | 0.1 | 0.1 | 0.1 | 0.1 | 0.1 |
| pH[10] | 11.0 ± 1.0 | 11.0 ± 1.0 | 11.0 ± 1.0 | 11.0 ± 1.0 | 11.0 ± 1.0 | 11.0 ± 1.0 | 11.0 ± 1.0 | 11.0 ± 1.0 | 11.0 ± 1.0 | 11.0 ± 1.0 |
| Polymerization temperature [° C.] | 11.5 ± 1.5 | 11.5 ± 1.5 | 11.5 ± 1.5 | 11.5 ± 1.5 | 11.5 ± 1.5 | 11.5 ± 1.5 | 11.5 ± 1.5 | 11.5 ± 1.5 | 11.5 ± 1.5 | 11.5 ± 1.5 |
| Polymerization conversion [%] | 56 | 58 | 56 | 79 | 78 | 80 | 78 | 71 | 68 | 69 |
| Polymerization time [h] | 5.5 | 7.25 | 7.5 | 6 | 6.25 | 5.75 | 6.0 | 3.5 | 3.75 | 5.0 |

[1]The increment was added at a monomer conversion of 52%
[2]The increment was added at a monomer conversion of 36%
[3]Sodium salt of disproportionated resin acid, CAS 61790-51-0
[4]AOS: Sodium α-olefin sulphonate
[5]Sulfole ® 120: t-DDM (tertiary dodecyl mercaptan); Chevron Phillips Chemicals
[6]Sulfole ® 100: (Mixture of tertiary dodecyl mercaptan and tertiary nonyl mercaptan); Chevron Phillips Chemicals
[7]Sulfole ® 90: (tertiary nonyl mercaptan); Chevron Phillips Chemicals
[8]comprising the reducing agent Rongalit ® C (sodium salt of a sulphinic acid derivative) and the $Fe(II)SO_4$.
[9]2-[(2-hydroxy-5-methyl-3-tert-butylphenyl)methyl]-4-methyl-6-tert-butylphenol; Lanxess Deutschland GmbH
[10]measured on commencement of polymerization

TABLE 2

| Nitrile rubber | Comparison A | Comparison B | Comparison C | Comparison D | E | Comparison F | G | Comparison H | I | J |
|---|---|---|---|---|---|---|---|---|---|---|
| ACN content (% by weight) | 35.0 | 35.3 | 34.7 | 34.1 | 34.1 | 28.0 | 28.5 | 49.6 | 50.5 | 49.6 |
| Mooney viscosity (ML 1 + 4@100° C.) | 57 | 50 | 38 | 36 | 48 | 65 | 63 | 76 | 80 | 83 |
| Volatile constituents (mg/kg)[2)] | 464 | 70 | 31 | 177 | 26 | 134 | 31 | 40 | 27 | 6 |
| Emission quotient E (mg/(kg Mu))[3)] | 2.85 | 0.49 | 0.28 | 1.68 | 0.18 | 0.58 | 0.14 | 0.26 | 0.17 | 0.04 |

[1)] Mean value from duplicate TDS GC-MS analysis according to VDA recommendation 278 (September 2000)
[2)] Regulator constituents emissions for TDS GC-MS analysis according to VDA recommendation 278 (Version September 2000) between 28.4 und 34.0 min
[3)] Emission quotient E determined according to general formula (I)

Table 2 clearly shows that the process according to the invention, using the specific molecular weight regulators while simultaneously fulfilling the condition that the polymerization conversion must be 60% or more, gives polymers clearly differing from the nitrile rubbers obtained using a conventional tert-dodecyl mercaptan and/or lower conversions in that they exhibit considerably reduced VOC values and regulator emissions in TDS GC-MS analyses.

III Production of Vulcanizates of the Nitrile Rubbers A to F

Inventive Examples and Comparative Examples

The vulcanizates V1 to V7 were produced from the nitrile rubbers D to J by the method described hereinbelow. The amounts of the mixture constituents are based on 100 parts by weight of rubber and specified in Table 3.

The mixtures were produced in a Banbury Mixer. To this end, the nitrile rubber and all additives named in Table 3 were mixed at a maximum temperature or up to 120° C. for a total of 4 minutes. To this end, the rubber was initially charged in the mixer, all further additives were added after 1 minute, and after 2 further minutes a reversal step was conducted. After a total of 4 minutes, the rubber was discharged from the mixer. The vulcanizates obtained had the properties specified in Table 4.

The vulcanization characteristics of the mixtures were analysed according to ASTM D 5289-95 at 160° C. with the aid of a MDR2000 Moving Die Rheometer from Alpha Technology. The characteristic vulcameter values which follow were determined in this way.

In this context:
Min. torque: is the vulcameter reading at the minimum of the crosslinking isotherm
Max. torque: is the maximum on the vulcameter display
TS01: is the time in minutes in which the Mooney viscosity of the mixture increases by one Mooney unit compared to the starting value

TABLE 3

Rubber mixtures

| Mixture | V1 Comparison | V2 | V3 Comparison | V4 | V5 Comparison | V6 | V7 |
|---|---|---|---|---|---|---|---|
| Polymer D | 100 | | | | | | |
| Polymer E | | 100 | | | | | |
| Polymer F | | | 100 | | | | |
| Polymer G | | | | 100 | | | |
| Polymer H | | | | | 100 | | |
| Polymer I | | | | | | 100 | |
| Polymer J | | | | | | | 100 |
| Further mixture constituents | | | | | | | |
| Carbon black IRB 7[1)] | 40 | 40 | 40 | 40 | 40 | 40 | 40 |
| Edenor ® C 18 98-100[2)] | 1 | 1 | 1 | 1 | 1 | 1 | 1 |
| SULFUR SPIDER[3)] | 1.54 | 1.54 | 1.54 | 1.54 | 1.54 | 1.54 | 1.54 |
| VULKACIT ® NZ/EGC[4)] | 0.7 | 0.7 | 0.7 | 0.7 | 0.7 | 0.7 | 0.7 |
| IRM 91[5)] | 3 | 3 | 3 | 3 | 3 | 3 | 3 |

[1)] IRB 7: carbon black (Sid Richardson Carbon Co.)
[2)] Edenor ® C 18 98-100: stearic acid (Caldic)
[3)] SULFUR SPIDER: sulphur ($S_8$) (Krahn Chemie GmbH)
[4)] VULKACIT ® NZ/EGC: N-tert-butyl-2-benzothiazolesulphenamide (TBBS) (Lanxess Deutschland GmbH)
[5)] IRM 91: zinc(II) oxide: (Midwest Zinc)

$t_{10}$: time at which 10% of the final conversion/degree of vulcanization has been attained $t_{50}$: time at which 50% of the final conversion/degree of vulcanization has been attained $t_{90}$: time at which 90% of the final conversion/degree of vulcanization has been attained

TABLE 4

Vulcanization characteristics

| Mixture | V1 Comparison | V2 | V3 Comparison | V4 | V5 Comparison | V6 | V7 |
|---|---|---|---|---|---|---|---|
| MDR (160° C./30 min) | | | | | | | |
| Min. torque (dNm) | 1.3 | 1.8 | 2.8 | 2.9 | 2.1 | 2.2 | 2.5 |
| Max. torque (dNm) | 15.9 | 18.8 | 18.3 | 19.2 | 21.7 | 22.2 | 24.4 |
| TS01 (min) | 2.7 | 2.6 | 2.5 | 2.3 | 1.9 | 1.8 | 1.5 |
| $t_{10}$ (min) | 2.8 | 2.9 | 2.8 | 2.6 | 2.2 | 2.0 | 1.8 |
| $t_{50}$ (min) | 3.8 | 3.6 | 3.5 | 3.1 | 4.3 | 4.3 | 3.6 |
| $t_{90}$ (min) | 10.8 | 9.5 | 6.1 | 5.7 | 18.5 | 18.5 | 18.3 |

Compared to the respective comparative examples V1, V3 and V5, the mixtures V2, V4, V6 and V7, which are based on nitrile rubbers according to the invention, feature a higher maximum torque in the vulcanization which is an important parameter for the vulcanization characteristics. The resultant higher crosslinking density makes it possible for the user to reduce the amount of the starting materials for crosslinking in order to arrive at a crosslinking density equivalent to that of the comparative examples.

What is claimed is:

1. A vulcanizable mixture comprising at least one pros linker and a nitrile rubber comprising repeat units of at least one α,β-unsaturated nitrile monomer and at least one conjugated diene monomer, wherein the nitrile rubber has an emission quotient E according to general formula (I) of less than or equal to 0.25 mg/(kg*Mooney units)

$$E = \frac{[\text{volatile constituents}]}{[\text{Mooney viscosity}]} \times \frac{[\text{nitrile content}]}{100} \quad (I)$$

where
[volatile constituents] is the volatile constituents concentration in mg/kg of nitrile rubber determined by IDS GC-MS analysis according to VDA recommendation 278 (version September 2002) between 28.4 min and 34.0 min,
[Mooney viscosity] is the Mooney viscosity ML 1+4 at 100° C. of the nitrile rubber in Mooney units determined according to ASTM D 1646, and
[nitrile content] is the dimensionless α,β-unsaturated nitrile content in the nitrile rubber, wherein such content is determined in % by weight pursuant to DIN 53 625 according to Kjeldahl.

2. The vulcanizable mixture according to claim 1, wherein the nitrile rubber is prepared in emulsion in the presence of tertiary nonyl mercaptan, wherein the emulsion polymerization is carried out up to a conversion of at least 60% by weight, based on the sum of the monomers.

3. The vulcanizable mixture according to claim 1, wherein;
the nitrile rubber is prepared emulsion in the presence of tertiary nonyl mercaptan, wherein the emulsion polymerization is carried out up to a conversion of at least 60% by weight, based on the sum of the monomers;
the at least one α,β-unsaturated nitrile monomer is selected from a croup consisting of ($C_3$-$C_5$) α,β-unsaturated nitriles and mixtures thereof; and
the at least one conjugated diene monomer is selected from a group consisting of ($C_4$-$C_6$) conjugated diene and mixtures thereof.

4. The vulcanizable mixture according to claim 1, wherein:
the nitrile rubber is prepared in the presence of tertiary nonyl mercaptan;
the at least one α,β-unsaturated nitrile monomer is selected from a group consisting of acrylonitrile, methacrylonitrile, ethacrylonitrile, and mixtures thereof; and
the at least one conjugated diene monomer is selected from a group consisting of 1,2-butadiene, 1,3-butadiene, isoprene, 2,3-dimethylbutadiene, piperylene and mixtures thereof.

5. The vulcanizable mixture according to claim 1, wherein:
the nitrile rubber is prepared in the presence of tertiary nonyl mercaptan;
the at least one α,β-unsaturated nitrile monomer is acrylonitrile; and
the at least one conjugated diene monomer is 1,3-butadiene.

6. The vulcanizable mixture according to claim 1, further comprising one or more fillers and no, one or more additional additive(s).

7. The vulcanizable mixture according to claim 6, wherein the one or more additional additives are selected from the group consisting of filler activators, antiozonants, ageing stabilizers, antioxidants, processing aids, extender oils, plasticizers, reinforcing materials and mould release agents.

8. A process for producing the vulcanizable mixture according to claim 1, the process comprising mixing together the nitrile rubber, the at least one crosslinker, and optionally at least one further additive.

9. A process for producing vulcanizates, the process comprising vulcanizing the vulcanizable mixture according to claim 1.

10. The process according to claim 9, further comprising vulcanizing the vulcanizable mixture at a temperature of 100° C. to 200° C.

11. The process according to claim 9, further comprising vulcanizing the vulcanizable mixture at a temperature of 120° C. to 190° C.

12. A vulcanizate comprising the nitrile rubber according to claim 1.

13. The vulcanizate according to claim 12, wherein the vulcanizate is a shaped article.

14. The vulcanizate according to claim 13, wherein the vulcanizate is a drive belt, a roll covering, a seal, a cap, a stopper, a hose, a floor covering, a sealing mat or sheet, a profile or a membrane.

* * * * *